(12) United States Patent
Charignon

(10) Patent No.: US 10,941,526 B2
(45) Date of Patent: Mar. 9, 2021

(54) DECOR PAPER FOR LAMINATES

(71) Applicant: Ahlstrom-Munksjö Oyj, Helsinki (FI)

(72) Inventor: Sébastien Charignon, Saint Ondras (FR)

(73) Assignee: Ahlstrom-Munksjö Oyj, Helsinki (FI)

( * ) Notice: Subject to any disclaimer, the term of this patent is extended or adjusted under 35 U.S.C. 154(b) by 0 days.

(21) Appl. No.: 16/481,889

(22) PCT Filed: Feb. 2, 2018

(86) PCT No.: PCT/EP2018/052684
§ 371 (c)(1),
(2) Date: Jul. 30, 2019

(87) PCT Pub. No.: WO2018/141915
PCT Pub. Date: Aug. 9, 2018

(65) Prior Publication Data
US 2019/0390411 A1   Dec. 26, 2019

(30) Foreign Application Priority Data

Feb. 3, 2017   (FR) ..................................... 1750957

(51) Int. Cl.
| | | |
|---|---|---|
| *B32B 3/00* | (2006.01) | |
| *D21H 27/18* | (2006.01) | |
| *B32B 29/00* | (2006.01) | |
| *D21H 17/66* | (2006.01) | |
| *D21H 17/67* | (2006.01) | |
| *D21H 19/40* | (2006.01) | |
| *D21H 19/56* | (2006.01) | |
| *D21H 19/60* | (2006.01) | |
| *D21H 23/64* | (2006.01) | |

(52) U.S. Cl.
CPC ............ *D21H 27/18* (2013.01); *B32B 29/00* (2013.01); *D21H 17/66* (2013.01); *D21H 17/675* (2013.01); *D21H 19/40* (2013.01); *D21H 19/56* (2013.01); *D21H 19/60* (2013.01); *D21H 23/64* (2013.01)

(58) Field of Classification Search
CPC ............................. D21H 17/67; D21H 17/675
See application file for complete search history.

(56) References Cited

U.S. PATENT DOCUMENTS

| | | | | |
|---|---|---|---|---|
| 3,223,579 A | * | 12/1965 | Baldwin ................. | D21H 27/38 162/123 |
| 2015/0299962 A1 | * | 10/2015 | Perrin ..................... | D21H 17/68 428/32.21 |
| 2016/0009114 A1 | | 1/2016 | Leifert et al. | |

FOREIGN PATENT DOCUMENTS

| | | |
|---|---|---|
| WO | 2006/076725 A2 | 7/2006 |
| WO | 2014/068502 A1 | 5/2014 |
| WO | 2016/175824 A1 | 11/2016 |

* cited by examiner

*Primary Examiner* — Elizabeth E Mulvaney
(74) *Attorney, Agent, or Firm* — Edwin A. Sisson, Attorney at Law, LLC; Jeffrey J. Banyas

(57) ABSTRACT

Decoration paper for a decorative laminate, which is inkjet printable, comprising a paper substrate comprising at least one opacifying pigment having a refractive index of greater than 2, and on at least one face of the substrate a surface treatment comprising a binder and between 0.5 and 9 g/m² of a filler having a specific surface area of between 2 and 100 m2/g and a refractive index of less than or equal to 2.

23 Claims, 3 Drawing Sheets

| Formulation (% sec / total dry formula) | Total dry deposit (g/m²) | Total dry deposit of filler (g/m²) | Total dry deposit of cationic product (g/m²) | Weight of finished paper (g/m²) | Gurley air permeability (s/100 cm³) | Resin penetration time recto (s) | Resin penetration time verso (s) | Optical density (*) on printed paper (**) | Optical density (*) on printed paper (**) and laminate |
|---|---|---|---|---|---|---|---|---|---|
| Control without treatment | 0.0 | 0.0 | 0 | 68.0 | 11 | 1 | 1 | 0.87 | 1.34 |
| Example 1 (counter example) | 5.3 | 4.1 | 0 | 73.3 | 35 | 23 | 15 | 1.31 | 1.72 |
| Example 2 (counter example) | 7.7 | 6.0 | 0 | 75.7 | 51 | 35 | 20 | 1.50 | 1.75 |
| Example 3 (counter example) | 9.5 | 7.4 | 0 | 77.5 | 56 | 49 | 52 | 1.51 | 1.68 |
| Example 4 (according to invention) | 9.4 | 7.3 | 0.5 | 77.4 | 23 | 3 | 2 | 1.61 | 2.03 |
| Example 5 (cationic product alone) | 0.5 | 0.0 | 0.5 | 68.5 | 11 | 1 | 1 | 1.11 | 1.54 |
| Example 6 (according to invention) | 9.7 | 7.2 | 0.5 | 77.7 | 23 | 5 | 3 | 1.60 | 2.07 |
| Example 7 (cationic product alone) | 0.9 | 0.0 | 0.9 | 68.9 | 11 | 1 | 1 | 1.22 | 1.64 |
| Example 8 (according to invention) | 9.4 | 8.6 | 0.9 | 77.4 | 24 | 3 | 3 | 1.77 | 2.34 |
| Example 9 (cationic product alone) | 0.5 | 0.0 | 0.5 | 68.5 | 11 | 1 | 1 | 1.27 | 1.76 |
| Example 10 (according to invention) | 10.3 | 7.5 | 0.5 | 78.3 | 22 | 4 | 3 | 1.60 | 2.52 |
| Example 11 (cationic product alone) | 0.9 | 0.0 | 0.9 | 68.9 | 11 | 1 | 1 | 1.45 | 1.98 |
| Example 12 (according to invention) | 10.3 | 7.2 | 1.0 | 78.2 | 23 | 6 | 4 | 2.22 | 3.13 |
| Example 13 (according to invention) | 9.9 | 7.7 | 0.0 | 77.9 | 24 | 4 | 6 | 1.75 | 2.25 |
| Example 14 (according to invention) | 10.4 | 8.3 | 0.0 | 78.4 | 19 | 3 | 2 | 1.96 | 2.72 |
| Example 15 (according to invention) | 2.8 | 2.2 | 0.0 | 70.8 | 22 | 8 | 1 | 2.57 | 4.75 |

Fig. 1

DECOR PAPER FOR LAMINATES

PRIORITIES AND CROSS REFERENCES

This Application claims priority from International Application No. PCT/EP2018/052684 filed on 2 Feb. 2018 and French Application No. 1750957 filed on 3 Feb. 2017, the teachings of each of which are incorporated herein by reference in their entirety.

The present invention relates to the field of decor papers.

In particular, the invention relates to a decor paper suitable for inkjet printing, a production process for such a paper and a laminate containing such a paper.

Decorative laminated panels (also called "laminates") have been used for many years as materials in homes and commercial and industrial buildings. Typical applications of such laminates are floor coverings, in particular imitating parquet, furniture coverings, table top, work surfaces and chairs, among others.

There are two main types of decorative "laminate": the so-called high pressure types (HPL or "High-Pressure Laminates") and the so-called low pressure types (LPL or "Low-Pressure Laminates").

Decorative HPL laminates are produced from a body made up of resin-impregnated sheets. These sheets are usually in kraft paper and have been impregnated with a thermosetting resin, most commonly a phenolic resin. After impregnating the sheets with resin, they are dried, cut and stacked on top of each other. The number of sheets in the stack depends on the applications and varies between 3 and 9, but can be higher. A decor paper is then placed on the stack of sheets making up the body. This is usually a sheet of paper with a printed design or a colour or containing decorative particles, impregnated with a thermosetting resin, selected from among the melamine-formaldehyde, urea-formaldehyde, benzoguanamine-formaldehyde or unsaturated polyester resins, or other resin, in particular epoxy or polyurethane.

In general, a protective sheet called "overlay" having no design and transparent in the final laminate is placed over the decor paper to improve the abrasion resistance of the laminate. The stack of impregnated sheets is then placed in a laminating press whose platens are lined with a metal sheet conferring the desired surface state to the laminate. The stack is then densified by heating at a temperature of the order of 110° C. to 170° C., and by pressing at a pressure of the order of 5.5 MPa to 11 MPa, for about 25 to 60 minutes, to obtain a unified structure.

The latter is then fixed on a base support; for example, it is glued to a particle board, in particular a wood particle board.

High pressure laminates can also be obtained without impregnation by a so-called "dry process", which consists in using a decor paper non-impregnated with thermosetting resin, generally sandwiched between a resin-impregnated barrier positioned underneath, and a protective overlay sheet also resin-impregnated and placed on top. There are variants where the overlay sheet is not placed on top but underneath. The decor paper becomes impregnated with resin when a pressure is exerted on the stack of various sheets, by diffusion of the resin of the resin out of the barrier and overlay papers with which the decor paper is in contact or is close to.

So-called low pressure laminates (LPL) are produced by using only decor paper impregnated with thermosetting resin, and possibly an overlay sheet, which is laminated directly on the base support during a short cycle at a temperature of the order of 160° to 200° C. and a pressure of 1.25 to 3 MPa.

Apart from the high pressure and low pressure processes, there is a continuous lamination process called CPL (continuous pressed laminates), which is similar to the high pressure process in which impregnated papers dispensed from spools are used instead of pre-cut sheets.

The decor paper used for producing laminates is generally a sheet of paper produced on a paper machine. A decor paper is generally used to convey a particular aesthetic appearance to the laminated support on which it is placed. Its opacity will then mask the support (namely the board for a low pressure laminate or the body of phenolic resin-impregnated sheets for a high pressure laminate) and it will provide a colour if it is a plain paper or a design if it is a printed decor paper.

This printed decorative design, traditionally imitating the appearance of a natural material such as wood or marble, comes in a wide variety of forms to satisfy the demands for customisation. This increase in variety means that there is a multitude of designs and a reduced number of production quantities per type of design.

This phenomenon of decor customisation and small series production has its consequences on the difficulties encountered by decor paper manufacturers. In the mass production of designs, printing techniques such as rotogravure have the advantage of printing at high rates, allowing the use of mechanically imposing machines in which the printing designs are relatively costly engraved cylinders dedicated to a single design. Because of this, these printing techniques are not financially viable for small runs.

Among printing techniques that are sufficiently flexible to print small quantities of decor paper on demand, inkjet printing is proving a very promising technique since computer control enables a fast change from one design to another.

However, in adapting decor papers for inkjet printing, manufacturers are confronted with major difficulties in obtaining laminates.

In the traditional laminate manufacturing process, the decor paper is first of all printed, then impregnated with resin and finally hot pressed with its support at high or low pressure. The impregnation requires a decor paper with high moisture resistance, so as to retain sufficient strength after total immersion in the resin, the latter preferably being aqueous, together with an ability to be totally impregnated or at least totally traversed by the resin in as short a time as possible. The characteristics related to impregnation are generally obtained by using decor papers with very high permeability to air and importer resin.

The inkjet printing technique is based on the principle of fixing the ink to the surface of the substrate being printed; to obtain a high quality clean print, the ink absorption of the latter must therefore be controlled. Thus, the papers normally used for inkjet printing outside the field of laminate manufacture to produce colour prints, graphics or photographic quality prints have a sealed surface produced by a synthetic resin layer or coating layer. Such papers are therefore unsuitable for laminates given that they cannot be satisfactorily impregnated by a thermosetting resin. Similarly, since these papers are not in the decor paper category, they are not suitable for the lamination process without impregnation (dry process), because of the delamination of the various layers that occurs during steam and water immersion resistance tests, since diffusion of the resin is hindered by the sealed surface of these papers, resulting in a poorly hardened laminate.

It is also apparent that the standard decor papers used in rotogravure cannot be suitable for inkjet printing because of their inability to hold the ink at the surface of the paper, as a result of their high porosity, needed for fast uniform impregnation by the resin.

Decor papers improved with an ink receiving coating containing ink fixing particles and a binder have already been described, in particular in patents EP 1 749 134 and EP 1 044 822.

Patent EP 1 044 822 describes the use of conventional coating techniques for the ink receiving layer, which can result in a substantial reduction in the resin impregnation properties of the paper through pre-impregnation of the paper base and because of the presence of the ink receiving layer.

Patent EPI 749 134 demonstrates the increase in resin impregnation time on the coated side.

The ink fixing particles are traditionally silica, with high specific surface area.

These silicas have a tendency to seal the decor paper, reducing porosity and permeability to air and resin impregnation.

The greater the quantity of binder in the applied layer, the better these silicas are held on the paper substrate, but both the air permeability and the rate of absorption of the resin by the paper decrease with increasing quantity of binder, and the impregnation rate falls.

To conserve the ability of the decor paper to be impregnated rapidly, one may try reducing the amount of binder, but the ink fixing particles are less strongly held, resulting in problems of dust and clogging of the installations using these papers.

Furthermore, in the paper substrate, decor papers usually contain an opacifier pigment with a relatively high refractive index, such as titanium dioxide. Because of this, if ink particles penetrate into the substrate during printing, then because of the proximity of the opacifier pigment, this tends to cause undesirable laitance because of the diffusion of light by the opacifier pigment. This is particularly so with inkjet printing in which the inks are very fluid and the pigment particle size is very small, favouring penetration of the ink into the paper.

WO 2006/076725 A2 discloses a decor paper that can be used to form a laminate, the decor paper containing a heated mixture of high refractive index pigment and dehydroxylated kaolin, the dehydroxylated kaolin containing metakaolin or completely calcined kaolin. This mixture is added to the mass of paper substrate and enables the amount of high refractive index pigment such as titanium dioxide that is introduced into the paper substrate to be reduced, while maintaining the properties of the decor paper, such as the opacity level and whiteness.

Publication WO 2016/175824 A1 discloses a decor paper without coating treatment, and in particular with no externally added binder.

U.S. Pat. No. 8,153,211 discloses a decor paper containing an ink receiving layer which is coloured such that the paper has the same colour as a stacked sheet that has no ink receiving layer, with the aim of reducing the amount of pigment in the paper substrate.

Patent EP 1 749 134 claims a coating process to obtain a decor paper that can be printed by inkjet without any great reduction in its impregnation properties. However, coating is trickier to apply than by conventional techniques, and in particular must be done offline.

EP 2 828 092 describes a decor paper containing an ink receiving layer deposited at a rate of 10 à 30 g/m$^2$ and in which substantially the whole opacifier pigment filler is contained in the ink receiving layer, in order to avoid having to introduce an opacifier pigment in the paper substrate.

US 2016/0009114 A1 discloses a decor paper comprising a base paper substrate and an ink receiving layer containing a pigment selected from among the oxides of aluminium, the hydroxides of aluminium, boehmite and silicas.

Application WO 2014/068502 describes a low opacity decor paper containing a powdery filler distributed through its thickness, chosen for its oil absorption properties. Such a decor paper, because of its low opacity, has to be superposed within the laminate on a sheet with opaque background. Now, in certain applications, it is preferable to avoid the use of such a background sheet because it complexifies the production process and increases costs.

Application WO 2016/066531 discloses a manufacturing process for decorative laminates in which an ink fixing composition is deposited by a droplet projection process prior to inkjet printing. The ink fixing composition contains silicas and a binder.

As the state of the technique reveals, if a decor paper allowing high quality inkjet printing is to be produced which at the same time has a high absorption rate for manufacturing high or low pressure laminates, contradictory requirements have to be met.

The invention aims to remedy the problems encountered in the prior art with decors for laminates by offering a decor paper that has good opacity, can be printed by inkjet printing and is suitable for industrial production of all types of laminates, with or without prior impregnation of the decor paper, in particular by the use of high pressure or low pressure processes or without impregnation (dry process), preferably a low pressure process.

The invention achieves this aim with a decor paper for decorative laminates printable by inkjet, comprising a paper substrate with at least one opacifier pigment of refractive index greater than 2, preferably TiO$_2$, and on at least one side, a surface treatment comprising a binder and between 0.5 and 9 g/m$^2$ of a filler with specific surface area from 2 to 100 m$^2$/g and refractive index equal to or less than 2. The specific surface area can in particular be less than 100 m$^2$/g. The quantity of 0.5 to 9 g/m$^2$ is per treated side. Thus, when both sides are treated, the quantity of filler of specific surface area from 2 to 100 m$^2$/g and refractive index equal to or less than 2 is between 1 and 18 g/m$^2$ for the decor paper. The quantity of filler is, for example, between 2 et 4 g/m$^2$ per treated side.

By "surface treatment" on at least one side of the paper, we mean the compounds resulting from the application on this side of at least one composition applied in one or more passes so as to obtain the desired surface quantity of filler. Application is preferably carried out in such a way that the distribution of filler according to the invention within the thickness of the substrate gives a concentration of filler that decreases from the surface of the treated side towards the depth of the paper substrate.

The surface treatment according to the invention acts effectively as a barrier to the diffusion of ink within the paper and prevents the ink from unduly reaching the opacifier pigment contained in the paper substrate. The diffusion of light referred to previously is thereby avoided.

Because of the low specific surface area of the filler according to the invention, unlike the fillers usually found in inkjet ink such as described in U.S. Pat. No. 8,153,211, the invention enables a sufficiently high layer to be deposited to create an actual physical barrier, thereby limiting the extent to which the ink of the inkjet procedure can reach the opacifier pigment.

The low specific surface area particles of filler according to the invention have the advantage of creating a more air and resin-permeable structure and removes the constraints on the proportion of binder needed, which can now be lower, which also contributes to obtaining a more air and resin-permeable structure.

The lower proportion of binder does not result in dust formation problems because the binder particles according to the invention are easier to bind than the inkjet binders traditionally used, such as silicas.

Surprisingly, the invention thus enables a satisfactory compromise between the various contradictory requirements cited above.

Furthermore, the treatment according to the invention makes the paper less sensitive to the type of ink used, namely aqueous or UV-curable. The barrier function is effective in the invention in holding the ink at the surface of the paper, whatever differences there may be in the ink ionicity. The paper is very suitable both for aqueous inks, UV inks (UV-curable) and EBC inks (Electron Beam Curing). In other words, the treatment according to the invention produces a physical barrier which functions independently of the type of ink used and the formulation of the ink, and confers a universal character on decor paper in terms of type of ink.

The surface treatment is preferably deposited in a quantity of up to 10 g/m² per treated side, or better, equal to or less than 5 g/m² in dry weight per treated side. The quantity is for example between 3 and 6 g/m² per treated side, or between 4 and 5 g/m².

The filler to binder ratio can be greater than 3:1, in particular 3.5:1 in dry weight.

The surface treatment can be given to only one side of the paper substrate.

Only a single side of the paper need be treated, namely the printed side. However, given the good impregnability of resin in the paper obtained according to the invention, all of the paper can if required be treated by coating procedures that deliver part of the treatment both through the paper thickness and on both sides of the paper. Various paper treatments known to experts in the field can thus be used to apply the surface treatment: size press, film press, coating bar, Meyer bar, knife coating, curtain coating, engraved cylinder, spraying, droplet projection (in particular, inkjet type).

The surface treatment is preferably applied by film press, enabling only a single side to be treated at once and over a relatively small thickness. In this case, the filler distribution profile through the thickness of the decor paper is such that the particle concentration of the filler decreases rapidly with depth.

The specific surface area of the filler is preferably from 2 to 50 m²/g, in particular 10 to 30 m²/g.

The paper may, at least on the side treated by a surface treatment, have a resin penetration time equal to or less than 10 s, or better equal to or less than 5 s.

The paper preferably has a resin penetration time on each of its sides equal to or less than 10 s, better equal to or less than 5 s.

The binder can represent between 10 and 50% in dry weight of the weight of the surface treatment. There can thus be between 0.05 and 2.5 g/m² binder per treated side.

The binder can be water-soluble. The binder can contain or be composed of PVOH.

The surface treatment can be without silica and/or without carbonates and/or without opacifier pigment, in particular without $TiO_2$.

The surface treatment can contain silica in a proportion equal to or less than 50% of the mass of surface filler according to the invention, i.e. the specific surface filler according to the invention and the refractive index equal to or less than 2, or better between 5 and 30% by mass. The silica used has a specific surface area greater than 100 m²/g, and better, 150 m²/g. The presence of a relatively small proportion of silica at the surface of the paper can further improve the printing definition without unduly blocking the paper.

The filler according to the invention can be inorganic, and can contain at least one compound chosen from among clays, calcined clays, kaolins, in particular natural kaolins, delaminated kaolins and other aluminium silicates, including synthetic, talcs, diatomaceous earths, aluminium trihydrate and mixtures of these, the compound being chosen such as to have the specific surface area required by the invention.

The surface treatment can contain salt of an alkaline earth metal, in particular $CaCl_2$).

The surface treatment can contain a cationic polymer, in particular a polyDADMAC.

The opacifier pigment with refractive index greater than 2 can be introduced into the mass of the substrate.

The quantity of opacifier pigment, in particular $TiO_2$, introduced into the mass of the substrate can be equal to or greater than 10% of the total dry weight of the paper, more preferably greater than 20% or still better 25%.

The invention also relates to a decor paper according to the invention, as defined above, containing at least one printed design on at least one of its sides, before impregnation by resin, in particular thermosetting resin.

Such a design can be printed by inkjet printing, preferably with an aqueous ink, a UV-curable ink, EB-curable ink, a solvent or eco-solvent ink.

The invention also relates to a decor paper according to the invention, printed by inkjet.

According to another embodiment, the invention also relates to a manufacturing process for decor paper according to the invention, as defined above, comprising the step consisting in:

Applying to at least one side of a paper substrate comprising at least one opacifier pigment with refractive index greater than 2, preferably $TiO_2$, at least one composition comprising a binder and a filler with specific surface area from 2 to 100 m²/g and refractive index equal to or less than 2, a quantity such that between 0.5 and 9 g/m² of filler in dry weight is deposited on the paper per treated side.

The invention furthermore relates to a high, low pressure laminate or continuous pressure laminate, preferably a low pressure laminate, containing at least one decor paper according to the invention.

According to another of its embodiments, the invention further relates to the use of a composition comprising a binder and a filler of specific surface area from 2 to 100 m²/g and refractive index equal to or less than 2 to improve the printability by inkjet printing on decor paper, with the composition applied in such a way that the quantity in dry weight of filler on the paper is between 0.5 and 9 g/m² per treated surface.

As mentioned above, the treated paper preferably contains an opacifier pigment with refractive index greater than 2.

Filler

Figures 1, 2:
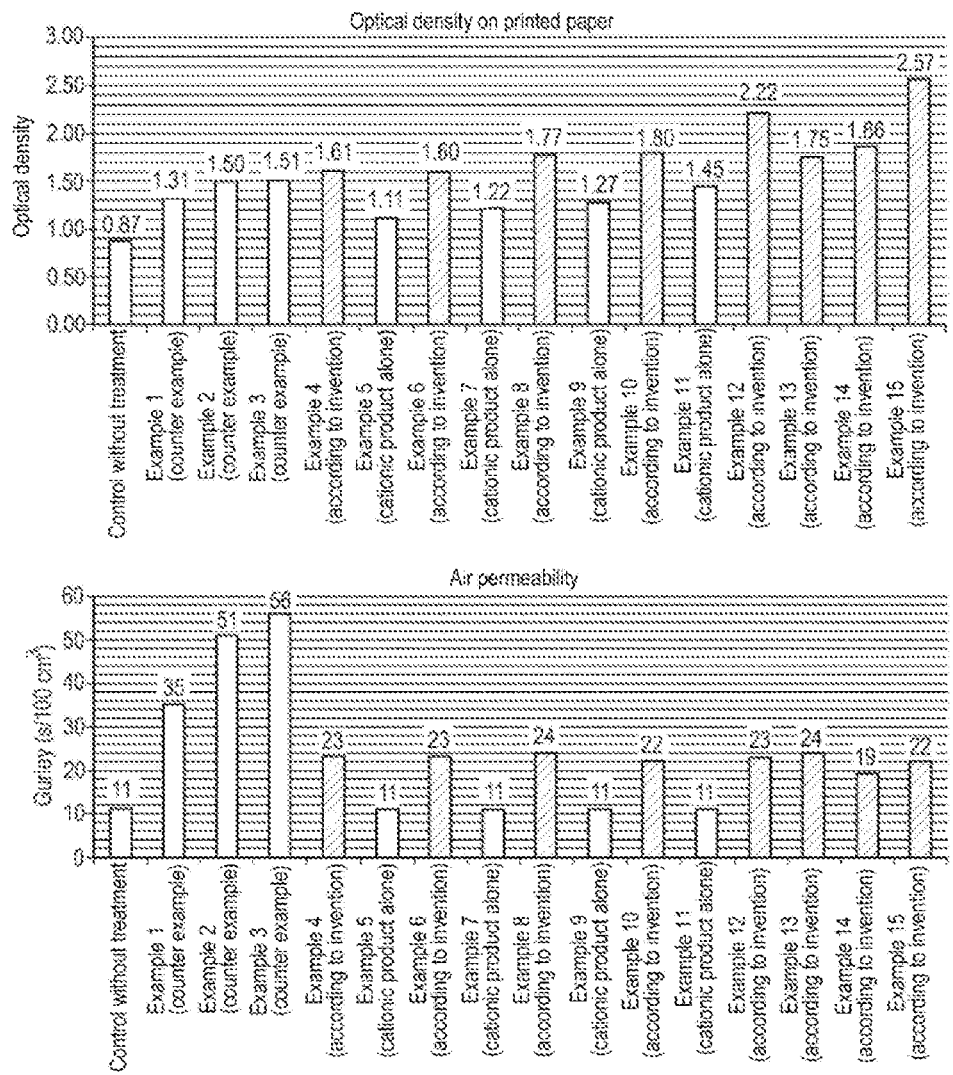
FIG. 1 is a table of the concentrations and formulations of examples 1 to 15.
FIG. 2 is a chart of the optical density and air permeability of examples 1 to 15.
Figure 2:
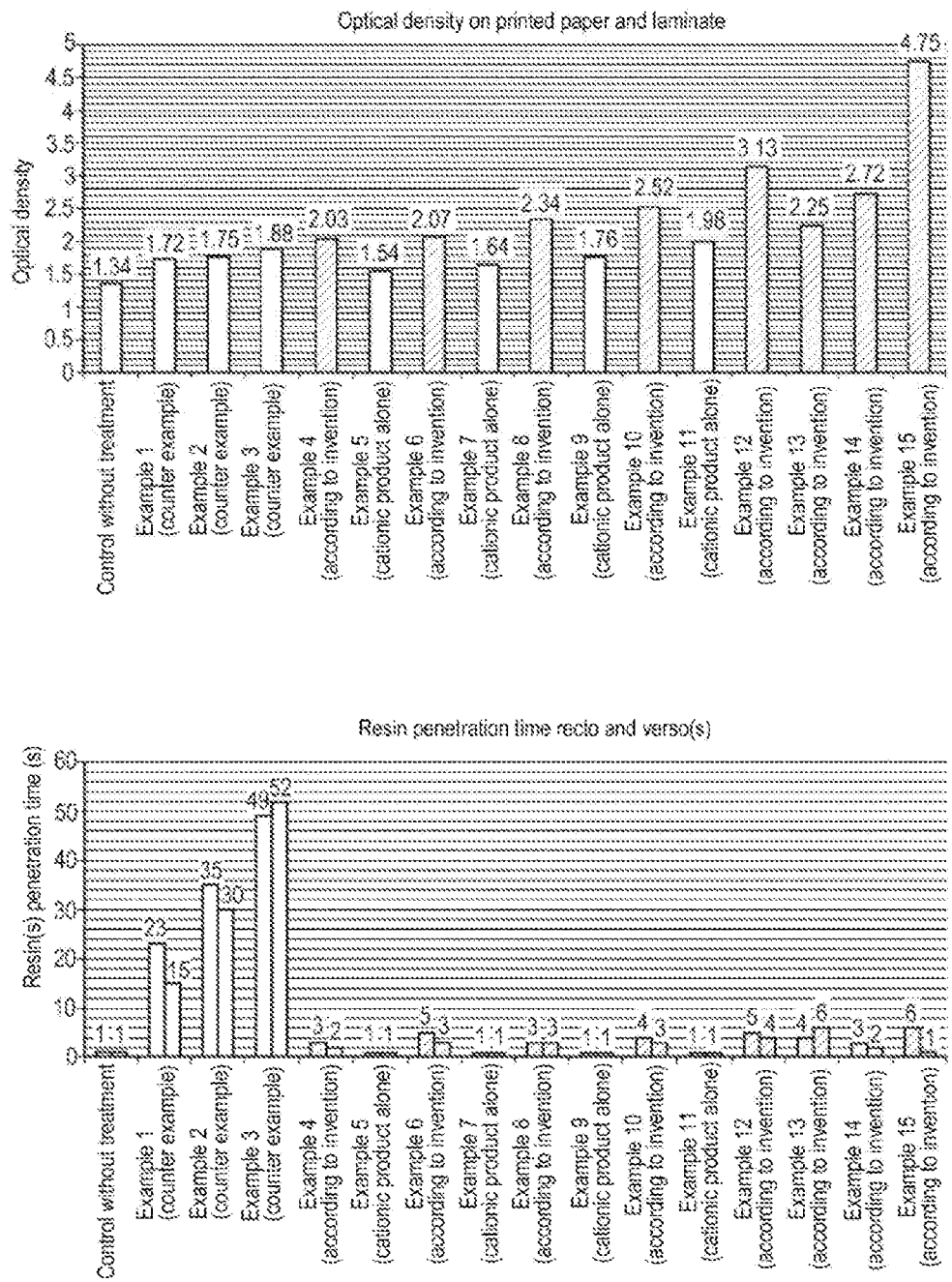

In the meaning of the invention, "filler" is intended to designate particles of a single type of particular material or a mixture of particles of different types of particular material, each with the required properties in terms of specific surface area and refractive index. The filler is preferably composed of a single particular material such as calcined kaolin.

The ink fixing particles of a filler suitable for the invention have a specific surface area from 2 to 100 $m^2/g$, or better from 2 to 50 $m^2/g$.

The specific surface area of the particles of a filler suitable for the invention is measured by the BET method according to standard DIN 66132.

The particles of a filler suitable for the invention can have a median diameter D50 in mass from 0.1 to 20 µm.

The particles of a filler suitable for the invention can have a shape chosen from among a lamellar shape, a globular shape; a spherical shape or any shape intermediate between the aforementioned shapes.

The particles of a filler according to the invention have a refractive index equal to or less than 2. The particles of a filler suitable for the invention preferably have a refractive index n between 1.3 and 1.8. $TiO_2$ (rutile and anastase forms) having a refractive index from about 2.5 to 2.8 is therefore excluded from the definition of a filler according to the invention.

The refractive index is measured using a refractometer, the most well known of which being the Abbe model.

Advantageously, the particles of a filler of the invention will be chosen such as to have a refractive index equal to, or substantially close to, the refractive index of the thermosetting resin used to impregnate the decorative paper of the invention.

Thus, between a filler according to the invention and a thermosetting resin, the difference $\Delta_n$ between the refractive indices will advantageously be equal to or less than 0.3.

The filler particles according to the invention can be chosen from among mineral particles, organic particles and mixtures of these.

The filler particles will preferably be chosen from among mineral particles.

Mineral filler particles suitable for the invention can be chosen from among clays, calcined clays, kaolins (in particular natural, calcined, delaminated and other aluminium silicates, in particular synthetic), talc, diatomaceous earths, aluminium trihydrate and mixtures of these, each with the required refractive index and specific surface area.

It is to be understood that, when a decorative paper according to the invention contains more than one type of filler particle according to the invention, in particular two, or three, or four distinct types of particle according to the invention, i.e. conforming in terms of specific surface area and refractive index, the quantities of filler given above present in the surface treatment must be taken as referring to the mixture of these particles, and not to each individual type of particle.

According to a preferred method of implementation, a decor paper according to the invention advantageously contains mineral particles and fillers composed of calcined kaolin. Advantageously, these particles are used at a rate varying from 2 à 4 $g/m^2$ in dry weight per treated side.

The filler particles, in particular mineral, used in the invention within the surface treatment are preferably neutral in terms of acidity or alkalinity towards thermosetting resins. By "neutral in terms of acidity or alkalinity" of the filler according to the invention in terms of thermosetting resin we mean the fact that the filler does not behave either as an acid or a base towards thermosetting resins.

Decor Paper

A decor paper according to the invention can have a paper weight from 20 to 200 $g/m^2$, preferably from 40 to 100 $g/m^2$ and more preferably from 50 to 80 $g/m^2$.

The weight of the sheets is determined according to standard ISO 536 after conditioning according to standard ISO 187. The weight is that of the sheet before impregnation by resin.

A decor paper according to the invention can be of any colour; more preferably it is of a light colour.

A decor paper according to the invention has in particular the property of being printable on the side coated with surface treatment, in particular by inkjet printing, while maintaining the thermosetting resin absorption properties identical or very close to those of known decor papers.

The impregnation of a decor paper according to the invention with a resin, in particular thermosetting, is advantageously carried out after a stage of inkjet printing of this paper.

A decor paper according to the invention can have a resin impregnation rate as defined below, equal to or less than 10 seconds, preferably equal to or less than 5 seconds, on the side coated with surface treatment.

The impregnation rate is measured by determining the resin penetration time through the sheet; this time is determined as follows:

a 50% by weight solution of resin is prepared by dissolving melamine-for-maldehyde KAURAMIN 773 resin in powder form in distilled water heated to about 45° C. Its viscosity is adjusted by slightly diluting with water so that it is of the order of 55 mPas (cps) around 20° C. on a Brookfield viscosimeter measured at 100 rpm—Shaft No. 2, the impregnation time of a sheet of paper is then determined as follows:

two square samples are cut (10×10 cm) per test; to test each side, the side is identified, a watchglass is filled with resin, the square of paper is placed on the surface of the resin with the side to be tested in contact with the resin, and the stopwatch is started at the same time, the time for complete penetration through the paper is recorded, giving the penetration time of the resin.

A decor paper according to the invention can have a Gurley porosity of 5 to 60 seconds, ideally 15 to 40 seconds. The air permeability, or Gurley porosity method, is determined according to standard ISO 5636-5:2013.

A decor paper of the invention can be smoothed or unsmoothed. A decor paper according to the invention can be smoothed by any process known to experts in the field. The paper can be given a smoothing treatment before receiving the surface treatment.

According to one method of implementation, a decor paper according to the invention has on at least one of its sides a Bekk smoothness of 20 to 200 seconds.

The surface treatment can be applied by any known coating technique. Thus, various paper treatments known to experts in the field can thus be used to apply the surface treatment: size press, film press, coating bar, Meyer bar, knife coating, curtain coating, engraved cylinder, spraying, droplet projection (in particular, inkjet type). Preferably, the treatment is carried out by a film transfer system (film press), as indicated above.

The surface treatment binder can be chosen from among water-soluble binders, in particular polymeric binders, such as PVOH, starch, gelatin, casein, CMC, guar. Preferably, the binder is PVOH.

The opacity of the decor paper according to the invention can be relatively high, as required.

A high pressure or low pressure laminate obtained with the decor paper according to the invention can contain one or more layers having a certain opacity.

The opacity of high pressure or low pressure laminates is measured by measuring the luminance Lo of the kraft side of the laminate. The luminance of the laminate at infinity (L∞) is measured on an opaque white background. The opacity is calculated by the formula: $L_0/L\infty*100$. The lower the value, the less opaque the paper, or the more transparent.

A high pressure laminate obtained with a decor paper according to the invention preferably has an opacity $L_0/L\infty*100$ equal to or greater than 70%, or better 80%.

A paper according to the invention can have the advantage of providing opacity, and need not be used with a white or coloured backsheet on which it is superposed.

A decor paper according to the invention can have a design printed on at least one of its sides. This design is advantageously printed by inkjet printing. The design is printed after drying and before impregnation by resin, in particular thermosetting resin.

A decor paper according to the invention can moreover contain the usual components entering into the formulation of decor papers.

Other Components

The paper substrate of a decor paper according to the invention traditionally contains cellulose fibres.

The cellulose fibres can be a mixture of short and long cellulose fibres.

Advantageously, a decor paper according to the invention contains a mixture of cellulose fibres with 60 to 100% of short cellulose fibres in dry weight. The decor paper can be without long fibres.

According to one method of implementation, the short cellulose fibres are *eucalyptus* fibres.

A decor paper according to the invention can contain synthetic fibres.

The paper substrate of a decor paper according to the invention can contain at least one additional agent chosen from the group consisting of a wet strength agent, a retention agent, decorative particles, mineral or organic particles, a cationic polymer, an absorbent organic polymer.

The substrate of a decor paper according to the invention can contain at least a wet strength agent.

By "wet strength agent" we mean any agent able to confer tensile strength to the wet paper. Such agents are known to experts in the field. Preferably, such an agent can be a polyamine-epichlorohydrin resin, a polyamide/polyamine-epichlorohydrin resin, a cationic polyacrylate, a modified melamine-formaldehyde resin or a cationic starch.

The proportion of a wet strength agent can be from 0.2 to 2.5% in dry weight with respect to the dry weight of the sheet, and more preferably from 0.4 to 0.8%.

The substrate of a decor paper according to the invention can contain at least a retention agent.

By "retention agent" we mean any agent able to fix mineral fillers to the fibres. Such agents are known to experts in the field. Preferably, such an agent can be chosen from the group consisting of a system of inorganic microparticles, for example anionic silicas, and a low ionicity polyacrylamide.

By "low ionicity" with respect to the polyacrylamide suitable for the invention, we mean a polyacrylamide containing few cationic co-monomers of the quaternary ammonium type and/or few acrylate groups of anionic character.

As described previously, during the manufacture of high pressure, low pressure or continuous pressure laminates, the decor paper is generally printed first, then impregnated with a heat-stable thermosetting resin and finally hot pressed on its support at high or low pressure. Alternatively, as described previously, in the case of a process without impregnation (dry process), the printed decor paper is stacked, non-impregnated, between two papers impregnated with thermosetting resin, and the decor paper is impregnated while pressure is exerted on the whole stack. As a result, a decor paper according to the invention can be used with or without thermosetting resin.

In particular, this thermosetting resin can be chosen from among melamine-formaldehyde resins, urea-formaldehyde resins, benzoguanamine-formaldehyde resins, unsaturated polyester resins, dicyandiamide-formaldehyde resins, epoxy resins, polyurethane resins and mixtures of these.

Once the decor paper is impregnated with resin, it is heated, the resin is partially cured (thermoset) so that it is no longer in a tacky state and the sheet can be handled. A decor paper impregnated with partially cured resin is called in the trade "decor film" or "decorative film" or "melamine film". This melamine film contains a proportion of resin preferably varying from 50 to 55% but it can vary from 30 to 70%.

This step is generally carried out by heating the decor paper at temperatures of about 110 to 140° C. and is controlled such that during the final lamination of the decor film, the resin flows properly in the sheet, by measuring the proportion of volatiles remaining in the decor film. The decor film then contains a certain percentage, of the order of 5 to 8%, of volatile products (resin solvent water, water from chemical condensation of the resin, residual formaldehyde, other residual products, etc.). These volatiles represent the compounds that will be eliminated when the resin is completely cured, during lamination of the decor film.

Once the resin has been cured, after lamination, it will provide strength to the surface of the final laminate (abrasion resistance, dirt resistance, steam resistance and resistance to chemicals such as solvents, acids and bases, etc.).

According to one special case, a decor paper of the invention is impregnated with thermosetting resin, then the resin is partially cured in acid medium, the proportion of volatile compounds being between 5 and 8% of the weight of the sheet.

The invention also relates to a decorated laminated board or profile containing at least a decor paper according to the invention.

A laminate according to the invention can contain, superposed by contact, at least two, preferably at least three and more preferably at least four, decor papers according to the invention.

Production Process

The fibrous base of a decor paper according to the invention containing cellulose fibres can be prepared by any process known to experts in the field.

Thus, a wet fibrous composition of cellulose, or paper pulp is first prepared.

According to one method of implementation, the particles of opacifier pigment are mixed with the fibrous cellulose composition before the latter is deposited on the formation surface.

This mixture can be made, for example, in the paper pulp vat, at the headbox, in the storage vat, at the refiners, or at the mixing pump.

According to one method of implementation, such a mixture can be made in a paper pulp vat.

One process for preparing decor paper of the invention can comprise a step consisting in adding a wet strength agent and/or a retention agent, such as defined above.

Preferably, the wet strength agent is an epichlorhydrin polyamine resin, and the retention agent can be a system of inorganic microparticles, for example anionic silicas or a low ionicity polyacryamide.

One process for preparing a decor paper according to the invention comprises a drying step which can be carried out by any method known to experts in the field, and usually used in the field. Such methods do not therefore need to be described further here.

One process for preparing a decor paper according to the invention comprises an extra step to apply a surface treatment.

This step can in particular be carried out by coating processes such as those listed above, preferably online, but also possible offline.

One paper according to the invention can advantageously be used to prepare a high or low pressure or continuous pressure laminate.

In the case of a high pressure laminate, the components of the base of the laminate are kraft sheets impregnated with thermosetting resin and the decor paper according to the invention impregnated or not with a resin, in particular thermosetting.

In the case of a low pressure laminate, the components of the base of the laminate are the supporting board, such as particle board, and a decor paper of the invention impregnated or not with a resin, in particular thermosetting.

EXAMPLES

A decor paper is first produced on a paper machine, the paper composed in particular of 100% short *eucalyptus* cellulose fibres, of $TiO_2$ for a proportion of 35% in the paper substrate, small quantities of pigment providing a shade to aim for a defined colour and various chemical agents, in particular a wet strength agent.

The manufacture of this paper follows the traditional paper process known to experts in the field, namely pulping of the paper, refining, addition of components ($TiO_2$, coloured pigments, additives), dilution then formation of the sheet, pressing and drying before arriving at the coating station which is always located on the paper machine.

The various formulations described in examples 1 to 15 in the tables corresponding to FIGS. 1 and 2 in the appended drawing are then applied to the paper. In examples 1 to 14, the coating station is a size press, a widely used paper process. In example 15, coating is done manually on one side of the substrate with a grooved rod to simulate coating (Meyer bar, knife coating layer, etc.) or film transfer (film press). The concentrations and formulations are adapted so as to obtain dry deposits with the values given in the table of FIG. 1. In the examples according to the invention given in FIG. 1 (except for example 15), the final paper weight obtained is between 75 et 80 $g/m^2$ but could be adjusted by changing the paper weight of the substrate. Example 15 has the lowest paper weight, because of the lesser quantity of deposit applied to a single side of the substrate, but this too could be adjusted by changing the paper weight of the substrate.

The results firstly show the pronounced effect of the silica-based formulation (called silica A in the example), which decreases the air permeability of the paper (the higher the Gurley index, the lower the permeability). Thus, even with only 5 $g/m^2$ from the formula given in example 1, the paper already has a Gurley value of 35 seconds while in example 4 according to the invention, the Gurley value is only 23 seconds for a deposit of 9.4 $g/m^2$. If the comparison is made between close deposition of 9.5 $g/m^2$ in example 3 and 9.4 $g/m^2$ in example 4, the difference is still more marked, with respectively 56 seconds vs 23 seconds.

The recto/verso penetration times of the resin are still more clearly affected: 23/15 seconds in example 1, $49/52$ seconds in example 3 compared with $3/2$ seconds in example 4.

The advantage of the invention can be seen very clearly in the optical density values since that of the paper in example 4 is 1.61 compared with 1.51 in example 3.

The same conclusions can be drawn for the optical densities of the papers after lamination.

The treatment of the invention thus enables an extremely useful compromise to be found between optical density and resin penetration time, reflecting the impregnability.

The other examples produced by adding a cationic product to formula 1 according to the invention (PolyDADMAC or $CaCl_2$) show synergy in the optical density without altering the resin penetration time.

The word "between" is understood as inclusive of limits unless otherwise stated.

The invention claimed is:

1. Decor paper for decorative laminates printable by inkjet, comprising a paper substrate with at least an opacifier pigment of refractive index greater than 2, and on at least one side of the substrate, a surface treatment comprising a binder and between 0.5 and 9 $g/m^2$ of a filler with specific surface area from 2 to 100 $m^2/g$ and refractive index equal to or less than 2.

2. Paper according to claim 1, with specific surface area of the filler from 2 to 50 $m^2/g$.

3. Paper according to claim 1 with a resin penetration time on at least the side having received the surface treatment equal to or less than 10 s.

4. Paper according to claim 3, the paper having a resin penetration time on each of its sides equal to or less than 10 s.

5. Paper according to claim 1 wherein the binder represents between 10 and 50% in dry weight of the surface treatment.

6. Paper according to claim 1 wherein the filler represents between 50 and 90% in dry weight of the surface treatment.

7. Paper according to claim 1 wherein the surface treatment is deposited at a rate from 1 to 10 $g/m^2$ in dry weight per treated side.

8. Paper according to claim 1 wherein the binder is water-soluble.

9. Paper according to claim 1 wherein the binder contains PVOH.

10. Paper according to claim 1 wherein the surface treatment is without silica.

11. Paper according to claim 1 wherein the surface treatment contains silica, in particular in a proportion equal to or less than 50% in mass of the said filler.

12. Paper according to claim 1 wherein the filler contains at least one compound chosen from among clays, calcined clays, kaolins (natural, calcined, delaminated, and other silicates of aluminium, in particular synthetic), talc, diatomaceous earths, aluminium trihydrate, and mixtures of these.

13. Paper according to claim 1 wherein the surface treatment contains a salt of an alkaline earth metal.

14. Paper according to claim 1 wherein the surface treatment contains at least one cationic polymer.

15. Paper according to claim 1 wherein the opacifier pigment contains $TiO_2$.

16. Paper according to claim 1 wherein the quantity of opacifier pigment in the paper substrate, in particular $TiO_2$, is equal to or greater than 10% of the total dry weight of the paper in $g/m^2$.

17. Paper according to claim 1 wherein only one side of the paper substrate has received the surface treatment.

18. Paper according to claim 1 wherein the quantity of filler is between 2 and 4 $g/m^2$ per treated side.

19. Paper according to claim 1 wherein the filler to binder ratio is greater than 3.1.

20. Printed decor paper, comprising a decor paper according to claim 1 and an inkjet print.

21. Decor paper manufacturing process, comprising the step consisting in applying to at least one side of a paper substrate at least one composition comprising a binder and a filler with specific surface area between 2 and 100 $m^2/g$ and refractive index equal to or less than 2, in a quantity such that between 0.5 and 9 $g/m^2$ of filler in dry weight is deposited on the paper.

22. Process according to claim 21 wherein the composition is applied by a film transfer system.

23. High, low or continuous pressure laminate, comprising a decor paper comprising a paper substrate with at least an opacifier pigment of refractive index greater than 2, and on at least one side of the substrate, a surface treatment comprising a binder and between 0.5 and 9 $g/m^2$ of a filler with specific surface area from 2 to 100 $m^2/g$ and refractive index equal to or less than 2.

* * * * *